US009615143B2

(12) United States Patent
Lee et al.

(10) Patent No.: US 9,615,143 B2
(45) Date of Patent: Apr. 4, 2017

(54) DEVICE AND METHOD FOR PROVIDING CONTENT BY ACCESSING CONTENT STREAM IN HYBRID 3D TV, AND DEVICE AND METHOD FOR REPRODUCING CONTENT

(75) Inventors: Joo Young Lee, Daejeon (KR); Sung Hoon Kim, Daejeon (KR); Jin Soo Choi, Daejeon (KR); Jin Woong Kim, Daejeon (KR); Suk Jin Hong, Daejeon (KR); Jin Suk Kwak, Daejeon (KR); Min Suk Lee, Daejeon (KR); Dong Wook Kang, Seoul (KR); Kyeong Hoon Jung, Seoul (KR)

(73) Assignees: Electronics and Telecommunications Research Institute, Daejeon (KR); KAI MEDIA CO., Daejeon (KR); Hidea Solutions Co., Ltd., Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 6 days.

(21) Appl. No.: 14/351,109

(22) PCT Filed: Aug. 23, 2012

(86) PCT No.: PCT/KR2012/006694
§ 371 (c)(1),
(2), (4) Date: Apr. 10, 2014

(87) PCT Pub. No.: WO2013/055032
PCT Pub. Date: Apr. 18, 2013

(65) Prior Publication Data
US 2014/0245371 A1 Aug. 28, 2014

(30) Foreign Application Priority Data

Oct. 10, 2011 (KR) .......................... 10-2011-0103262
Aug. 10, 2012 (KR) .......................... 10-2012-0087603

(51) Int. Cl.
*H04N 21/84* (2011.01)
*H04N 21/242* (2011.01)
(Continued)

(52) U.S. Cl.
CPC ......... *H04N 21/84* (2013.01); *H04N 21/2362* (2013.01); *H04N 21/242* (2013.01);
(Continued)

(58) Field of Classification Search
CPC .... H04N 21/84; H04N 21/242; H04N 21/845; H04N 21/2362; H04N 21/816;
(Continued)

(56) References Cited

U.S. PATENT DOCUMENTS

2008/0222300 A1* 9/2008 Bouazizi ........................ 709/231
2010/0257188 A1* 10/2010 Kim et al. ..................... 707/756
(Continued)

FOREIGN PATENT DOCUMENTS

KR 1020070052158 A 5/2007
KR 1020090066191 A 6/2009
(Continued)

*Primary Examiner* — Brian T Pendleton
*Assistant Examiner* — Alan Luong
(74) *Attorney, Agent, or Firm* — William Park & Associates Ltd.

(57) ABSTRACT

A content providing apparatus and method, and a content reproduction apparatus and method for accessing a content stream in a hybrid three-dimensional television (3DTV) are disclosed. The content providing apparatus may include a content stream generation unit to generate a first content stream corresponding to a reference image and a second
(Continued)

content stream corresponding to a supplementary image, a descriptor generation unit to generate a descriptor associated with the first content stream and the second content stream, and a data transmission unit to transmit the first content stream, the second content stream, and the descriptor to a content reproduction apparatus.

12 Claims, 8 Drawing Sheets

(51) Int. Cl.
    *H04N 21/2362* (2011.01)
    *H04N 21/434* (2011.01)
    *H04N 21/435* (2011.01)
    *H04N 21/462* (2011.01)
    *H04N 21/61* (2011.01)
    *H04N 21/81* (2011.01)

(52) U.S. Cl.
    CPC ..... *H04N 21/4345* (2013.01); *H04N 21/4348* (2013.01); *H04N 21/4351* (2013.01); *H04N 21/4622* (2013.01); *H04N 21/6112* (2013.01); *H04N 21/6131* (2013.01); *H04N 21/816* (2013.01)

(58) Field of Classification Search
    CPC ........... H04N 13/0029; H04N 13/0048; H04N 13/0059; H04N 13/0454; H04N 13/0066

USPC ....................... 725/116; 348/42–43, E13.064
See application file for complete search history.

(56) References Cited

U.S. PATENT DOCUMENTS

| | | | |
|---|---|---|---|
| 2010/0275238 A1* | 10/2010 | Nagasawa .......... | H04N 13/0033 725/116 |
| 2011/0063411 A1* | 3/2011 | Kitazato ............ | H04N 13/0059 348/42 |
| 2011/0261158 A1* | 10/2011 | Suh .................... | H04N 13/0059 348/43 |
| 2013/0141536 A1* | 6/2013 | Choe .................. | H04N 5/44591 348/43 |
| 2013/0222541 A1* | 8/2013 | Suh .................... | H04N 13/0029 348/43 |

FOREIGN PATENT DOCUMENTS

| | | |
|---|---|---|
| KR | 1020090102116 A | 9/2009 |
| KR | 1020100042771 A | 4/2010 |
| KR | 1020100050426 A | 5/2010 |
| KR | 1020110014821 A | 2/2011 |
| KR | 1020110088334 A | 8/2011 |
| WO | 2011068318 A2 | 6/2011 |

* cited by examiner

FIG. 5

| Syntax | No.of bits | Format |
|---|---|---|
| MH_Hybird_Stereoscopic_Service_Descriptor() { | | |
|     descriptor_tag | 8 | uimsbf |
|     descriptor_length | 8 | uimsbf |
| Stereoscpic_service_type | 3 | bslbf |
|     If(Stereoscopic_service_type==1) | | |
|     { | | |
|     PID | 13 | uimsbf |
|     additional_view_service_id | 16 | uimsbf |
|     IP_version_flag  ~501 | 1 | bslbf |
|     component_destination_IP_address | 32 or 128 | uimsbf |
|     component_destination_UDP_port_num | 16 | uimsbf |
|     additional_view_cropped_flag  ~502 | 1 | bslbf |
|     offset_sign_bit | 1 | bslbf |
|     timestamp_offset  ~503 | 32 | uimsbf |
|     VEI_flag | 1 | bslbf |
|     if(VEI_flag) | | |
|     {  ~504 | | |
|     VEI_PID | 13 | uimsbf |
|     } | | |
|     } | | |
| } | | |

FIG. 6

| Syntax | No.of bits | Format |
|---|---|---|
| MH_Hybird_Stereoscopic_Service_Descriptor() { | | |
|     descriptor_tag | 8 | uimsbf |
|     descriptor_length | 8 | uimsbf |
|     reserved | 5 | bslbf |
|     Stereoscopic_service_type | 3 | bslbf |
|     If(Stereoscopic_service_type==1) | | |
|     { | | |
|         additional_view_service_id | 16 | uimsbf |
|         reserved | 4 | bslbf |
|         additional_view_cropped_flag | 1 | bslbf |
|         VEI_flag | 1 | bslbf |
|         offset_sign_bit | 1 | bslbf |
|         leftview_flag | 1 | bslbf |
|         timestamp_offset | 32 | uimsbf |
|         if(VEI_flag) | | |
|         { | | |
|             VEI_PID | 13 | uimsbf |
|             reserved | 3 | bslbf |
|         } | | |
|     } | | |
| } | | |

DEVICE AND METHOD FOR PROVIDING CONTENT BY ACCESSING CONTENT STREAM IN HYBRID 3D TV, AND DEVICE AND METHOD FOR REPRODUCING CONTENT

TECHNICAL FIELD

The present invention relates to an apparatus and a method for a hybrid three-dimensional television (3DTV) expressed as a content stream associated with a reference image and a content stream associated with a supplementary image, and more particularly to an apparatus and a method for accessing a content stream independently transmitted based on hybrid broadcasting.

BACKGROUND ART

The Advanced Television Systems Committee (ATSC) A/153 Mobile Handheld (M/H) standard is a terrestrial broadcast standard in North America (for an in-band mobile TV service) capable of providing terrestrial mobile digital television (MDTV) broadcast services simultaneously by inserting/transmitting a main service stream for an existing stationary DTV and a time-division mobile stream within a single RF 6 megahertz (MHz) channel. Here, the MDTV services utilize part of a bandwidth of 19.39 megabits per second (Mbps), which is an ATSC data transmission rate, and internet protocol (IP) datagram-based transmission technology, thereby providing mobile/portable TV viewers with broadcast services.

In detail, an entire broadcast frame of about 19.39 Mbps is transmitted via time division with an ATSC main broadcast stream (MPEG-2 TS) packet and an MDTV mobile stream packet (IP datagram), making it possible to provide two broadcast services, in an independent manner, simultaneously. A plurality of methods are available for providing a three-dimensional television (3DTV) service in such broadcast environments, for example, transmitting a stream of a reference image needed to compose a stereoscopic image, which is used for a stationary two-dimensional (2D) service, and a stream of a supplementary image used to compose a 3D image along with the reference image as independent streams to an ATSC main broadcast stream (MPEG-2 TS) packet. However, this method involves allocation of an additional band to transmit the supplementary image stream even though the reference image is transmitted through an ATSC main broadcast stream to secure reverse compatibility with an existing stationary 2D broadcast. Thus, it is necessary to reduce an amount of data transmitted for individual 2D screen information, resulting in deterioration in an existing 2D broadcast service.

To solve such a problem, stationary and mobile hybrid 3DTV technology which enables transmission of a supplementary image using a 2D mobile service stream instead of separately transmitting the supplementary image for composing a 3D image, has an advantage of providing a 3DTV service without allocation of an additional bandwidth for transmission of a supplementary image.

To realize a 3DTV system using an ATSC main reference image and an M/H supplementary image, a reception unit may need to receive a content stream associated with a reference image and a content stream associated with a supplementary image through an ATSC main channel and an M/H channel, respectively. However, since a conventional ATSC main broadcast and an M/H broadcast are independent broadcast types, identification and access methods with respect to a reference image and a supplementary image in each broadcast stream are needed.

DISCLOSURE OF INVENTION

Technical Goals

An aspect of the present invention provides an apparatus and a method for accessing a content stream associated with a reference image and a content stream associated with a supplementary image for a hybrid three-dimensional television (3DTV).

Another aspect of the present invention also provides an apparatus and a method for accessing a content stream associated with a reference image and a content stream associated with a supplementary image through signaling in a hybrid 3DTV in which a stationary broadcast and a mobile broadcast are combined.

Technical Solutions

According to an aspect of the present invention, there is provided a content providing apparatus including a content stream generation unit to generate a first content stream corresponding to a reference image and a second content stream corresponding to a supplementary image, a descriptor generation unit to generate a descriptor associated with the first content stream and the second content stream, and a data transmission unit to transmit the first content stream, the second content stream, and the descriptor to a content reproduction apparatus.

According to an aspect of the present invention, there is provided a content reproduction apparatus including a data reception unit to receive a first content stream corresponding to a reference image, a second content stream corresponding to a supplementary image, and a descriptor associated with the first content stream and the second content stream from a content providing apparatus, and a service providing unit to provide a two-dimensional (2D) broadcast service or a three-dimensional (3D) broadcast service based on the first content stream and the second content stream using the descriptor.

According to an aspect of the present invention, there is provided a content providing method including generating a first content stream corresponding to a reference image and a second content stream corresponding to a supplementary image, generating a descriptor associated with the first content stream and the second content stream, and transmitting the first content stream, the second content stream, and the descriptor to a content reproduction apparatus.

According to an aspect of the present invention, there is provided a content reproduction method including receiving a first content stream corresponding to a reference image, a second content stream corresponding to a supplementary image, and a descriptor associated with the first content stream and the second content stream from a content providing apparatus, and providing a two-dimensional (2D) broadcast service or a three-dimensional (3D) broadcast service based on the first content stream and the second content stream using the descriptor.

Effects of the Invention

An exemplary embodiment of the present invention enables access to a content stream associated with a reference image and a content stream associated with a supplementary image for a hybrid three-dimensional television (3DTV).

An exemplary embodiment of the present invention enables access to a content stream associated with a reference image and a content stream associated with a supplementary image through signaling in a hybrid 3DTV in which a stationary broadcast and a mobile broadcast are combined.

BRIEF DESCRIPTION OF DRAWINGS

FIG. 5 illustrates an example of an actual descriptor according to an exemplary embodiment of the present invention;

FIG. 6 illustrates an example of an actual descriptor according to another exemplary embodiment of the present invention;

BEST MODE FOR CARRYING OUT THE INVENTION

Figure 1:
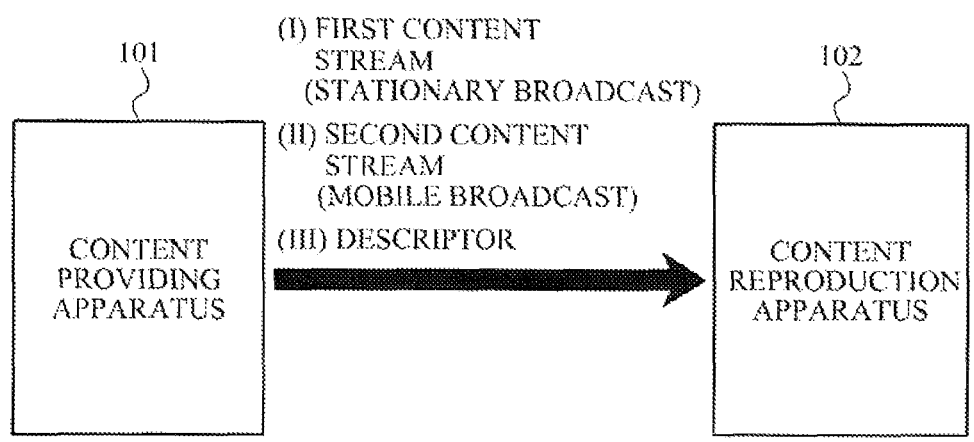
FIG. 1 illustrates an operation for accessing a content stream according to an exemplary embodiment of the present invention.

Hereinafter, exemplary embodiments of the present invention will be described in detail with reference to the accompanying drawings. However, the present invention is not limited to the exemplary embodiments. Also, like reference numerals refer to the like elements throughout.

Before exemplary embodiments of the present invention are described, terms used hereinafter will be defined briefly.

First, Advanced Television Systems Committee-Mobile/Handheld (ATSC-M/H) A/153, is a next-generation standard in North America for mobile digital TV which allows an ATSC system capable of supporting a transmission rate of up to 19.39 megabits per second (Mbps) through a 6 megahertz (MHz) bandwidth, to add mobile content to a space generated when transmitting HD content and to transmit the mobile content.

An ATSC main broadcast collectively refers to a fixed digital television (DTV) transmission scheme in North America, which includes ATSC A/53 high-quality DTV transmission and reception standards.

An access unit (AU) is a basic audio/video encoding unit of an elementary stream, in which an audio and a video are generally formed of a frame unit.

A real-time transport protocol (RTP) is a standard for transmitting audio/video data over an internet protocol (IP) network.

An RTP control protocol (RTCP) is a standard for transmitting a status of a transmission network or synchronization information on an audio/video stream for RTP transmission.

An RTCP sender report (RTCP_SR) is an RTCP transmission packet type used to transmit a status of a transmission network and timing information, periodically transmitted to a receiver by a sender.

A network time protocol (NTP) is a protocol used to synchronize clock times of computers connected via a network. Further, the NTP uses a Universal Time Coordinated (UTC) to synchronize computer clock times to within $\frac{1}{1000}$ of a second or less.

A presentation timestamp (PTS) is a 33-bit timestamp loaded onto a packetized elementary stream (PES) header and transmitted so as to synchronize presentation times of an audio/video AU in an ATSC 8-Vestigial sideband modulation (VSB) stationary broadcast network.

A PES is a packet obtained by dividing each elementary stream (ES) into a particular length for transmitting an audio/video ES in an ATSC main broadcast network. Here, the PES header includes a PTS.

An 8-VSB & M/H hybrid three-dimensional television (3DTV) system may utilize 8-VSB & M/H hybrid 3DTV technology capable of providing high-quality three-dimensional (3D) broadcast/high-quality two-dimensional (2D) broadcast/mobile broadcast services at the same time within a 6 MHz channel bandwidth with maximum frequency efficiency, while maintaining reverse compatibility with an existing broadcast system based on an ATSC A/153 M/H standard. An 8-VSB broadcast standard is used to transmit a reference image, while an existing M/H broadcast standard is used to transmit a supplementary image.

FIG. 1 illustrates an operation for accessing a content stream according to an exemplary embodiment of the present invention.

FIG. 1 illustrates a content providing apparatus 101 and a content reproduction apparatus 102. The content providing apparatus 101 may generate a first content stream corresponding to a reference image and a second content stream corresponding to a supplementary image. For 3DTV broadcasting, the reference image may be represented as a left image, and the supplementary image may be represented as a right image.

For example, the content providing apparatus 101 may generate a first content stream corresponding to a stationary broadcast and a second content stream corresponding to a mobile broadcast. Here, the reference image may be transmitted in a stationary broadcast standard, while the supplementary image may be transmitted in a mobile broadcast standard.

In this example, the stationary broadcast may include a content stream in accordance with the main ATSC broadcast standard, while the mobile broadcast may include a content stream in accordance with the M/H broadcast standard. In the present invention, the left image and the right image may replace each other.

Further, the content providing apparatus 101 may generate a descriptor associated with the first content stream and the second content stream. The content providing apparatus 101 may transmit the first content stream, the second content stream, and the descriptor to the content reproduction apparatus 102.

As such, the content providing apparatus 101 may transmit the reference image and the supplementary image to the content reproduction apparatus 102. Subsequently, the content reproduction apparatus 102 may utilize a 2D broadcast service or a 3D broadcast service using the reference image and the supplementary image. In detail, the content reproduction apparatus 102 may utilize a 2D broadcast service using the reference image only. Alternatively, the content reproduction apparatus 102 may utilize a 3D broadcast service using both the reference image and the supplementary image. Here, when the reference image and the supplementary image are transmitted in different broadcast standards, and thus represent different timing information, the content providing apparatus 101 may transmit synchronization information as well so that the reference image and the supplementary image are reproduced based on synchronization time for 3D broadcasting.

Figure 2:
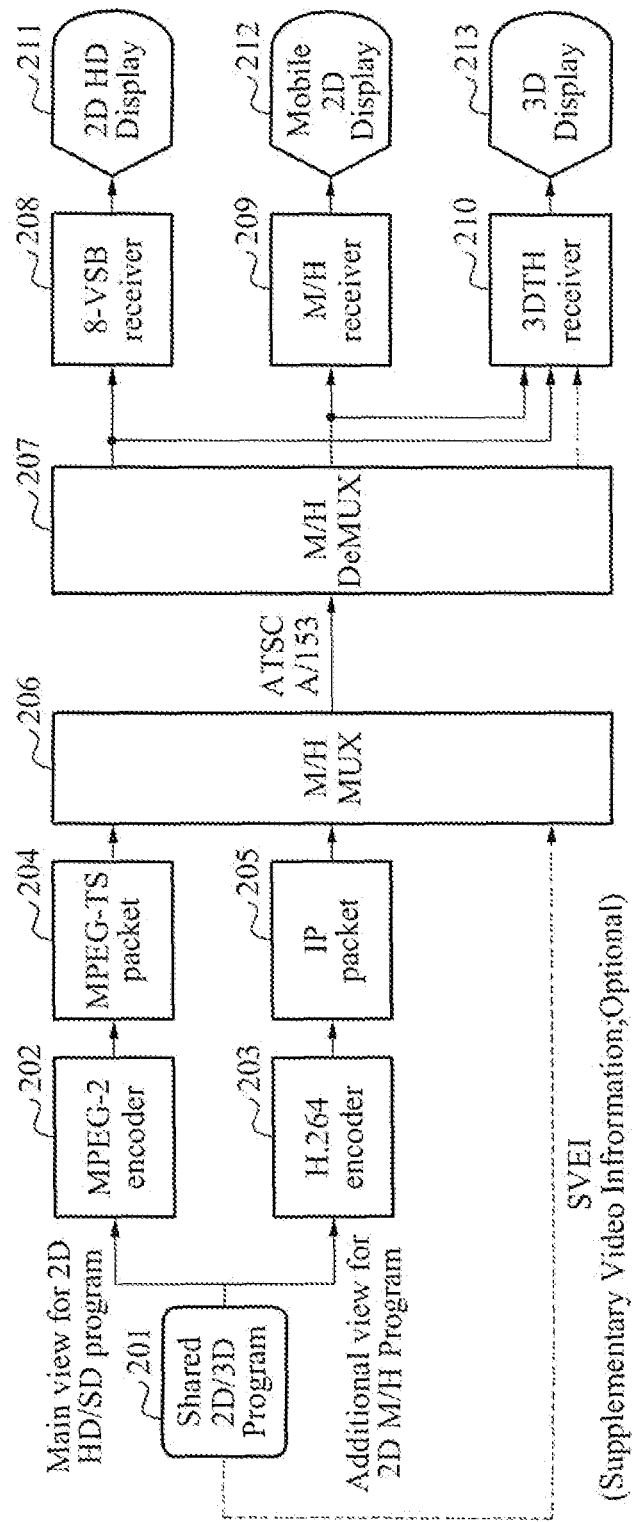
FIG. 2 illustrates a configuration of an actual system according to an exemplary embodiment of the present invention.

FIG. 2 illustrates a configuration of an actual system according to an exemplary embodiment of the present invention.

FIG. 2 illustrates an ATSC & M/H hybrid 3DTV system. The system may provide both a 2D broadcast service and a 3D broadcast service. A first content stream transmitted in the stationary broadcast standard is a reference image, while a second content stream transmitted in the mobile broadcast standard is a supplementary image.

An element 201 may identify a program in which a 2D program and a 3D program are shared. Here, reference image content for a 2D high definition (HD) program may be encoded into MPEG-2 through an element 202. Further, supplementary image content for a 2D M/H program may be encoded into H.264 through an element 203.

The reference image content encoded into MPEG-2 by the element 202 may be packetized into an MPEG-TS packet through an element 204. Then, the supplementary image content encoded into H.264 by the element 203 may be packetized into an IP packet through an element 205. The packetized reference image content and the packetized supplementary image content may be multiplexed through an element 206.

The multiplexed reference image content and the multiplexed supplementary image content may be demultiplexed through an element 207. Then, an element 208 may receive the reference image content in accordance with the ATSC main broadcast standard, and an element 211, a 2D HD display, may reproduce the reference image content.

An element 209 may receive the supplementary image content in accordance with the M/H broadcast standard, and an element 212, a mobile 2D display, may reproduce the supplementary image content.

An element 210 may receive the reference image content in accordance with the ATSC main broadcast standard and the supplementary image content in accordance with the M/H broadcast standard, and an element 213, a 3D display may reproduce the contents. In this case, 3D broadcasting is possible.

Figure 3:
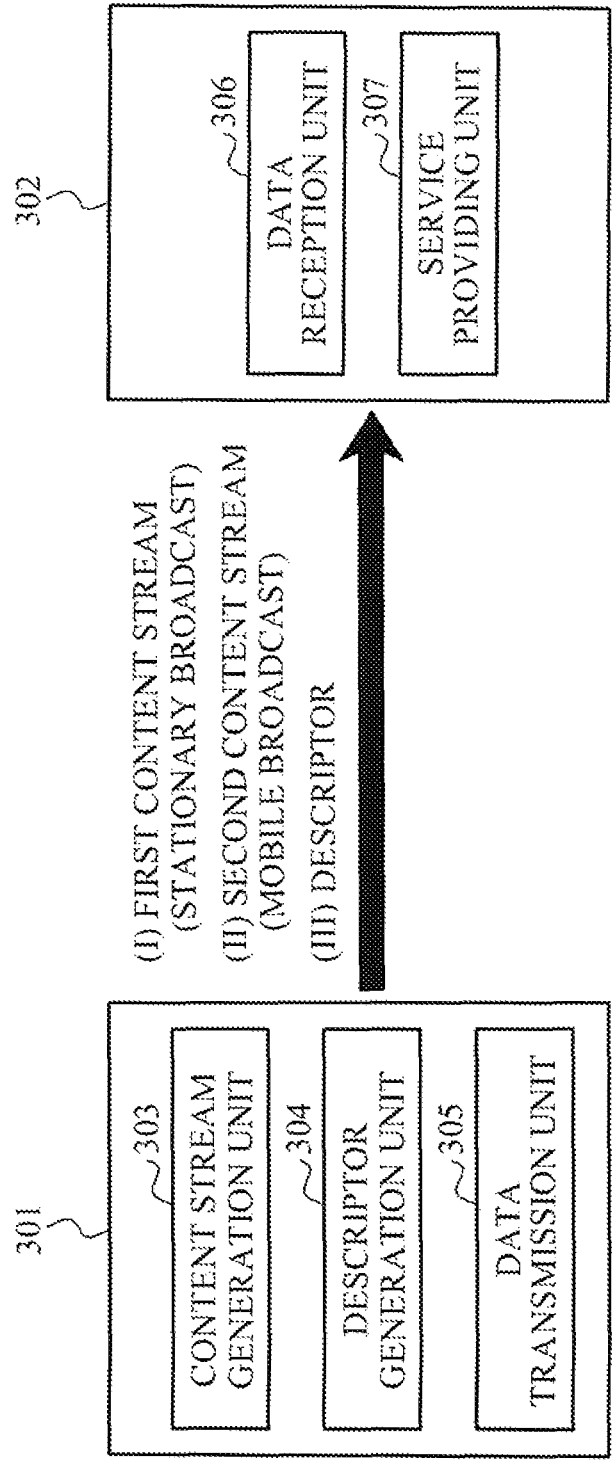
FIG. 3 illustrates detailed configurations of a content providing apparatus for a content reproduction apparatus according to an exemplary embodiment of the present invention.

FIG. 3 illustrates detailed configurations of a content providing apparatus and a content reproduction apparatus according to an exemplary embodiment of the present invention.

Referring to FIG. 3, the content providing apparatus 301 may include a content stream generation unit 303, a descriptor generation unit 304, and a data transmission unit 305.

The content stream generation unit 303 may generate a first content stream corresponding to a reference image and a second content stream corresponding to a supplementary image. Here, the reference image may be transmitted in a stationary broadcast standard and the supplementary image may be transmitted in a mobile broadcast standard. For example, a stationary broadcast may include a content stream in accordance with an ATSC main broadcast standard, while a mobile broadcast may include a content stream in accordance with an M/H broadcast standard.

The descriptor generation unit 304 may generate a descriptor associated with the first content stream and the second content stream. For example, the descriptor generation unit 304 may generate a descriptor including identification information to identify the first content stream and the second content stream. Further, the descriptor generation unit 304 may generate a descriptor including synchronization information to synchronize the first content stream and the second content stream. Also, the descriptor generation unit 304 may generate a descriptor including additional information to improve image quality of the first content stream or the second content stream. In addition, the descriptor generation unit 304 may generate a descriptor including crop information to indicate whether an image included in the first content stream or the second content stream is cropped. The descriptor will be described in detail with reference to FIGS. 4 and 5.

The data transmission unit 305 may transmit the first content stream, the second content stream, and the descriptor to a content reproduction apparatus. For example, the data transmission unit 305 may include and transmit the descriptor in at least one of the first content stream and the second content stream.

The content reproduction apparatus 302 may include a data reception unit 306 and a service providing unit 307.

The data reception unit 306 may receive the first content stream, the second content stream, and the descriptor from the content providing apparatus 301.

The service providing unit 307 may provide a 2D broadcast service or a 3D broadcast service based on the first content stream and the second content stream using the descriptor received from the content providing apparatus 301. As described above, the first content stream corresponds to the reference image, and the second content stream corresponds to the supplementary image.

Figure 4:
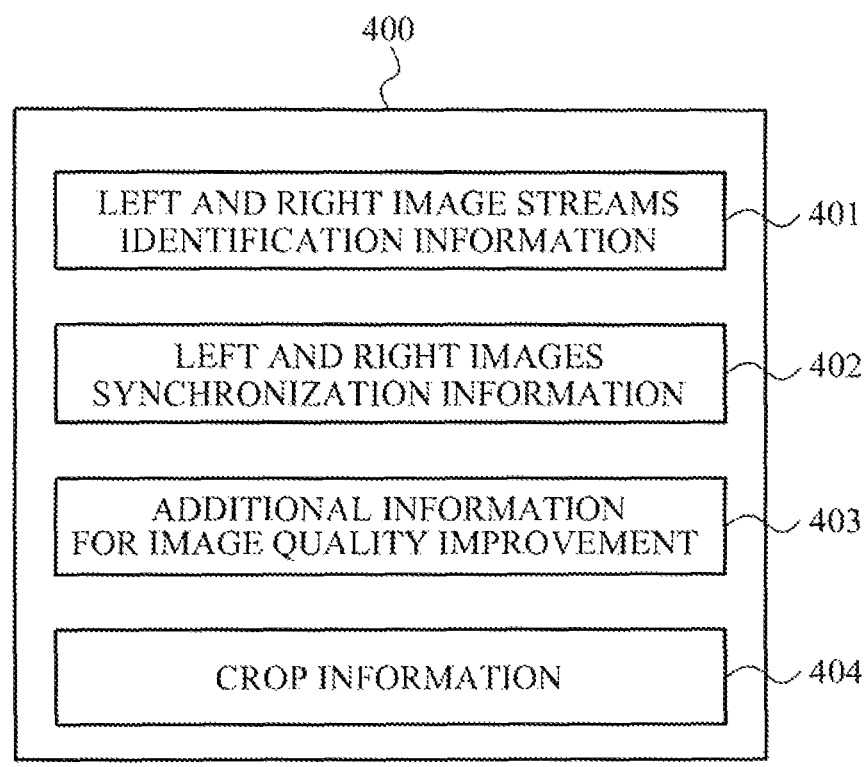
FIG. 4 illustrates a structure of a descriptor according to an exemplary embodiment of the present invention.

FIG. 4 illustrates a structure of a descriptor according to an exemplary embodiment of the present invention.

Referring to FIG. 4, a descriptor 400 may include identification information 401 to identify a content stream associated with a reference image or a content stream associated with a supplementary image. Here, when the content reproduction apparatus 302 identifies identification information on a content stream associated with either one of the reference image and the supplementary image, the content providing apparatus 301 may omit the identification information in the descriptor. For example, when stream identification information on the reference image and the supplementary image is transmitted in a descriptor of a table, such as a PMT of an MPEG-2 TS or TVCT of ATSC A/65 in an ATSC main broadcast stream, the reference image may be converted to a video stream of a program including the descriptor and the descriptor may include only identification information on the supplementary image stream of an M/H broadcast network.

Alternatively, when stream identification information on the reference image and the supplementary image is transmitted through a descriptor of a table, such as an SMT or an SLT in an M/H broadcast stream, the supplementary image may be converted to a video stream of a service including the descriptor and the descriptor may include only identification information on the reference image stream of an ATSC main broadcast network.

Further, the descriptor 400 may include synchronization information to synchronize the content stream associated with the reference image and the content stream associated with the supplementary image. For example, the synchronization information may include (i) a network time protocol (NTP) synchronization mode, (ii) a timestamp pairing mode, and (iii) a timestamp offset mode. The synchronization information will be described in detail with reference to FIGS. 6 to 8.

In addition, the descriptor 400 may include additional information 403 to improve image quality of the content stream associated with the reference image and the content stream associated with the supplementary image. The additional information 403 for improving the image quality of the content streams may be included or omitted as necessary. In this instance, the descriptor 400 may include information indicating whether an image included in the content stream associated with the reference image or the content stream associated with the supplementary image is cropped.

FIG. 5 illustrates an actual example of a descriptor according to an exemplary embodiment of the present invention.

In particular, FIG. 5 illustrates a syntax defining a descriptor.

First, an MH_Hybrid_Stereoscopic_Video_Descriptor may provide information on whether a program is a 2D (monoscopic) service or an M/H hybrid stereoscopic service. Here, the stereoscopic service is a service to utilize a 3D service by providing a reference image and a supplementary image in accordance with different broadcast standards. The MH_Hybrid_Stereoscopic_Video_Descriptor may provide information about which kind of stereoscopic service the program is.

When the program is a stereoscopic service, the MH_Hybrid_Stereoscopic_Video_Descriptor provides information needed to identify the content streams associated with the reference image and the supplementary image and to compose a 3D image. Further, the MH_Hybrid_Stereoscopic_Video_Descriptor selectively provides additional information to improve image quality of an M/H image. The MH_Hybrid_Stereoscopic_Video_Descriptor may be transmitted through a signalling channel, such as TVCT, PMT, EIT, or the like. When the MH_Hybrid_Stereoscopic_Video_Descriptor is absent, the program is not considered to be an M/H hybrid 3DTV service.

A Stereoscopic_service_type is information to determine whether an M/H service is a monoscopic service or a stereoscopic service and to distinguish a stereoscopic service type. The Stereoscopic_service_type may be specified in Table 1.

TABLE 1

| Values | Description |
| --- | --- |
| 000 | Reserved |
| 001 | M/H Hybrid Stereoscopic service |
| 0010~111 | Reserved |

A syntax 501 illustrates identification information to identify a content stream corresponding to a reference image or a content stream corresponding to a supplementary image.

A Program ID (PID) is identification information for identifying the content stream corresponding to the reference image. For example, when the reference image is transmitted in the stationary broadcast standard, the PID is identification information to identify a content stream corresponding to a stationary broadcast. Here, the stationary broadcast may be an ATSC main broadcast. The PID may be an identifier of an MPEG-2TS packet.

A Stereoscopic_service_id, an IP_version_flag, and a component_destination_IP_address, and a component_destination_UDP_port_num are identification information for identifying the content stream associated with the supplementary image. For example, when the supplementary image is transmitted in the mobile broadcast standard, the Stereoscopic_service_id, the IP_version_flag, the component_destination_IP_address, and the component_destination_UDP_port_num are identification information for identifying a content stream corresponding to a mobile broadcast. Here, the mobile broadcast may be M/H.

The Stereoscopic_service_id is an M/H Service id to which the content stream associated with the supplementary image for a stereoscopic service is transmitted.

When the P_version_flag is set to '0,' the component_destination_IP_address field is IPv4. When the IP_version_flag is set to '1,' an IP address in an IPv6 format is used in an A/153 Part 3 standard.

The component_destination_IP_address is a component destination IP address of the content stream associated with the supplementary image. Here, the content stream associated with the supplementary image may be transmitted in the mobile broadcast standard. Further, the component_destination_IP_address is used to identify the content stream associated with the supplementary image along with the component_destination_UDP_port_num field.

The component_destination_UDP_port_num is a component destination UDP port number of the content stream associated with the supplementary image.

As necessary, the PID or the M/H video stream identification information may be omitted in the syntax 501. For example, when a descriptor is inserted into a table, such as a PMT of an MPEG-2 TS or a TVCT of ATSC A/65 in an ATSC main broadcast stream and transmitted, the reference image may become a video stream of a program including the descriptor, and the descriptor may include only identification information on the supplementary image stream of an M/H broadcast network.

Alternatively, when a descriptor is inserted into a table, such as an SMT or an SLT in an M/H broadcast stream and transmitted, the supplementary image may be converted to a video stream of a service including the descriptor, and the descriptor may include only identification information on the reference image stream of a main ATSC broadcast network.

Further, only the stereoscopic_service_id may be transmitted so as to identify an M/H supplementary image video stream, omitting the IP_version_flag, the component_flag, the component_destination_IP_address, and the component_destination_UDP_port_num from the syntax 501. In this case, an image stream belonging to an M/H service corresponding to the stereoscopic_service_id may be used. In an illustrative process of omitting the PID or M/H video stream identification information described above, when a descriptor is included in the PMT or a Terrestrial Virtual Channel table (TVCT) of the ATSC main broadcast network and transmitted and only the stereoscopic_service_id is specified so as to identify the M/H video stream, only the stereoscopic_service_id may be included in the syntax 501 of the descriptor of FIG. 5.

As described above, the content reproduction apparatus 102 may identify the content streams associated with the reference image and the supplementary image to be used to compose a 3D image based on the syntax 501. Subsequently, the content reproduction apparatus 102 may extract the content streams associated with the reference image and the supplementary image based on the identification information, decode the streams, and then synchronize the decoded reference image and the decoded supplementary image, thereby composing/outputting a 3D image.

A syntax 502 may include information indicating whether the supplementary image is cropped. For example, although the M/H standard supports a resolution of a 16:9 image, a display screen may actually have a ratio that deviates slightly from 16:9. The current M/H standard also supports a resolution of 15:6:9. As such, when an M/H image having a ratio that deviates slightly from 16:9 is received, information on a region included in a 15.6:9 image may need to be signaled so that a 3D image is composed by the content reproduction apparatus.

For example, when an encoded M/H image fails to be an exact 16:9 image, whether a supplementary image transmitted to the content reproduction apparatus is cropped may be defined through an additional_view_cropped_flag field.

In detail, determining whether the supplementary image transmitted to the content reproduction apparatus is an encoded image after cropping left and right edges from an original image or the original image as it is by subtly modifying an aspect ratio of the original image may be carried out. That is, the additional_view_cropped_flag indicates whether the supplementary image transmitted to the content reproduction apparatus is an image obtained by excluding part of the original image or by just reducing the original image.

By way of example, the additional_view_cropped_flag of "1" means that cropping the left and right edges is carried out before encoding the M/H image, while the additional_view_cropped_flag of "0" means that size of the encoded M/H image is reduced so that the image includes all information of the original image.

In this example, when a leftview_flag is 1, the video stream of the ATSC main broadcast corresponding to the reference image may be used as a left image. When the leftview_flag is 0, the M/H video stream corresponding to the supplementary image may be used as a left image.

In addition, a syntax 503 is synchronization information for synchronizing the content stream associated with the reference image and the content stream associated with the supplementary image. Generally, the reference image and the supplementary image are transmitted in accordance with different broadcast standards, and thus different timing information may differ. Transitively, a playback time of the supplementary image may not be synchronized with that of the reference image. The syntax 503 may include the synchronization information for synchronizing the reference image and the supplementary image in a frame unit that is an AU so as to realize a 3D broadcast service using the reference image and the supplementary image.

According to an exemplary embodiment, the synchronization information may include the following three cases.

(i) Timestamp Pairing Mode

In the timestamp pairing mode, the syntax 503 may be expressed as follows:

| PTS | 33 | uimsbf |
|---|---|---|
| RTP_Timestamp | 32 | uimsbf. |

In the timestamp pairing mode, a timestamp pair including a timestamp corresponding to an AU of the reference image and a time stamp corresponding to an AU of the supplementary image to be output at the same random time for a 3DTV service is used as the synchronization information. Synchronization of the reference image and the supplementary image may be carried out using the timestamp of the reference image and the timestamp of the supplementary image provided as the synchronization information at a random synchronization time. Further, synchronization may be accurately corrected based on a reference clock of the reference image or a reference clock of the supplementary image.

Moreover, in the timestamp pairing mode, timestamps of AUs of left and right images are used as the synchronization information and a timestamp of content to be reproduced is converted into a proper form for a reference clock using the synchronization information in restoration. Here, when a restoring reference clock for 3D reproduction is set as an NTP clock of an MDTV, a PTS of a left image (ATSC-Main) is converted into an NTP Timestamp form. Further, when the restoring reference clock is set as a PCR clock, an RTP timestamp of a right image (MDTV) is converted into a PTS form.

(ii) Timestamp Offset Mode

In the timestamp offset mode, the syntax 503 may be expressed as follows:

| offset_sign_bit | 1 | tcimsbf |
|---|---|---|
| timestamp_offset | 32 | uimsbf |

A main content stream corresponding to the reference image and a supplementary content stream corresponding to the supplementary image have the same frame rate, and a PTS of an MPEG-2 system and an RTP timestamp of an MDTV system have the same clock rate.

Accordingly, the timestamp offset mode uses offsets of timestamps corresponding AUs of the reference image and the supplementary image which are to be output at the same random time for a 3DTV service as the synchronization information. The timestamp of the reference image is a PTS, while the timestamp of the supplementary image is an RTP timestamp. Further, in the time stamp offset mode, a timestamp of a content to be reproduced may be converted into a proper form for a reference clock using the synchronization information in restoration. Here, the timestamp is a PTS in the case of the reference image, while the timestamp is an RTP timestamp in the case of the supplementary image.

The content reproduction apparatus may convert the PTS of the reference image (ATSC-Main) into an NTP timestamp when using an NTP clock of the MDTV as the restoring reference clock for a 3D reproduction. Conversely, when using a PCR clock as the restoring reference clock, the content reproduction apparatus converts the RTP timestamp of the supplementary image (MDTV) into the PTS.

(iii) NTP Synchronization Mode

In the NTP synchronization mode, an NTP timestamp separately generated for synchronization of a main content stream and a supplementary content stream is additionally transmitted in addition to a PTS of the main content stream in accordance with the ATSC main broadcast standard and an RTP timestamp of the supplementary content stream in accordance with the MDTV broadcast standard.

In the NTP synchronization mode, the syntax 503 may be expressed as follows:

| NTP_offset | 64 | uimsbf. |
|---|---|---|

In the NTP synchronization mode, an NTP timestamp separately generated for synchronization of a content stream associated with a reference image and a content stream of a supplementary image is additionally transmitted in addition to a PTS of the content stream associated with the reference image in accordance with the 8-VSB broadcast standard and an RTP timestamp of the content stream of the supplementary image in accordance with the M/H broadcast standard.

Also, the syntax 504 is additional information to improve image quality of a content stream associated with a reference image or a content stream associated with a supplementary image.

In an M/H hybrid 3DTV, the reference image and the supplementary image have different broadcast networks, and thus resolution difference between left and right images may occur. A considerable difference in resolution may have an adverse effect on viewing the images. In order to overcome the resolution difference, additional information may be transmitted to improve quality of an image with low resolution. The additional information may include information on binocular disparity between images corresponding to the left and right eyes of a user watching an image, metadata for post-processing of a reception unit, or an enhancement layer using scalable video coding.

As an example of the additional information for image quality improvement, binocular disparity information is as follows. Since a stereoscopic image is obtained using two cameras, disposed to be distant from each other, taking an image at the same time, a reference image and a supplementary image has a remarkably high correlation. Here, quality of the supplementary image for a 3DTV may be improved from the reference image with corrected disparity using a high correlation between the reference image and the supplementary image.

The content providing apparatus may calculate/estimate information on binocular vectors of the reference image and the supplementary image using left and right images scaled to the same resolution and transmit the information as additional information to the content reproduction apparatus. The content reproduction apparatus improves the quality of the supplementary image with a low resolution close to an image quality of an 8-VSB reference image using the transmitted additional information.

The additional information for improving image quality may be defined as the syntax 504. The additional information for improving image quality may be transmitted through a PID added 8-VSB MPEG-TS, and the PID may be transmitted to the content reproduction apparatus through a signaling descriptor.

Here, a VEI_flag indicates whether additional information for improving image quality is present, and a VEI_PID is a PID of an MPEG-TS transmitting VEI for improving image quality. An illustrative service scenario based on the aforementioned syntaxes described is as follows.

(i) To change a channel in an 8-VSB terminal, find a service ID and a PID of a PMT to be changed through a PAT.

(ii) Find a corresponding PMT using the PMT and PID found through the PAT. Find and transmit a video and audio PID of a main stream to a decoder.

(iii) Find a channel having a service ID of the PMT or an MH_Hybrid_Stereoscopic_Video_Descriptor transmitted from the PMT in a TVCT and identify whether the channel is an M/H Hybrid Stereoscopic service. Find a service ID of M/H so as to identify a service corresponding to the M/H the supplementary image.

(iv) Find an ensemble to which the identified service is transmitted by parrsing FIC in an M/H terminal, find video information on the supplementary image through an SMT of the service (maximum delay time=1936 milliseconds (ms)) by tuning with the ensemble, and deliver the video information to a corresponding decoder.

(v) Deliver a VEI_PID to a VEI Decoder when a VEI_flag of an MH_Hybrid_Stereoscopic_Video_Descriptor is True.

(vi) Input an output obtained by processing an MPEG-2 Video stream of an 8-VSB and an AVC Video stream of M/H put into corresponding decoders, into a 3D Video Formatter to generate and output a 3D video on a screen when a VEI_flag of an MH_Hybrid_Stereoscopic_Video_Descriptor is False, and select a right or left of the output image being conducted in accordance with a leftview_flag.

(vii) Process an MPEG-2 Video stream of an 8-VSB and an AVC Video stream of M/H put into corresponding decoders, input the output image from the AVC decoder and a VED into a VEI decoder to improve image quality, input the image output from the MPEG-2 decoder and the image output from the VEI decoder into a 3D Video Formatter to generate and output a 3D Video on a screen when a VEI_flag of an MH_Hybrid_Stereoscopic_Video_Descriptor is True, and select a right or left of the output image being conducted in accordance with a leftview_flag.

FIG. 6 illustrates an actual example of a descriptor according to another exemplary embodiment of the present invention.

FIG. 6 illustrates a syntax including brief information as compared with the syntax illustrated in FIG. 5. Details of the syntax of FIG. 6 may refer to those of FIG. 5.

Figure 7:
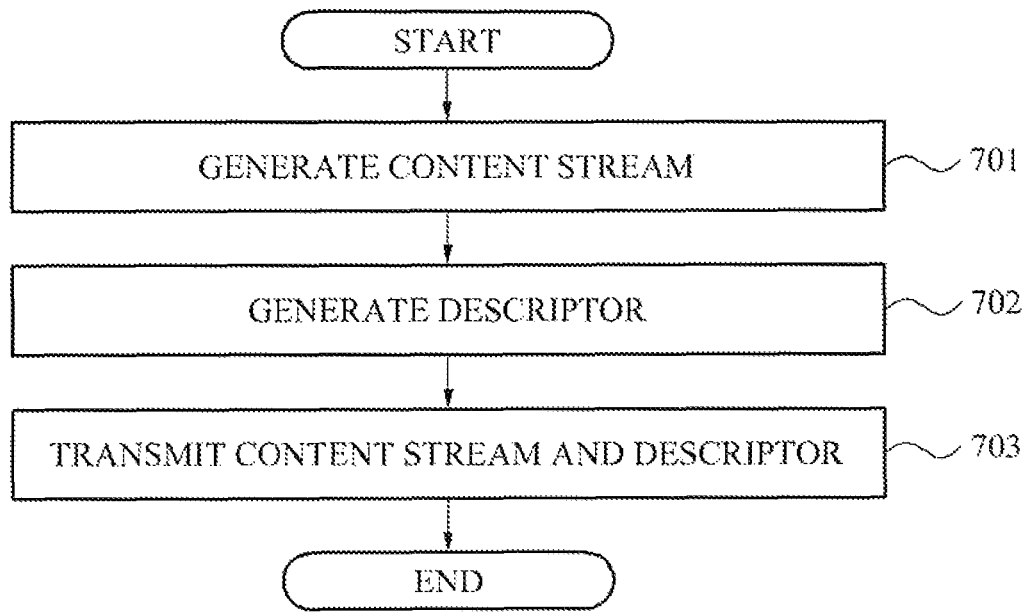
FIG. 7 illustrates a content providing method according to an exemplary embodiment of the present invention.

FIG. 7 illustrates a content providing method according to an exemplary embodiment of the present invention.

Referring to FIG. 7, a content providing apparatus may generate a first content stream corresponding to a reference image and a second content stream corresponding to a supplementary image in operation 701.

Subsequently, the content providing apparatus may generate a descriptor associated with the first content stream and the second content stream in operation 702. For example, the content providing apparatus may generate a descriptor including identification information to identify the first content stream and the second content stream. Further, the content providing apparatus may generate a descriptor including synchronization information to synchronize the first content stream and the second content stream. Also, the content providing apparatus may generate a descriptor including additional information to improve image quality of the first content stream or the second content stream. In addition, the content providing apparatus may generate a descriptor including crop information to indicate whether an image included in the first content stream or the second content stream is cropped.

The content providing apparatus may transmit the first content stream, the second content stream, and the descriptor to a content reproduction apparatus. For example, the content providing apparatus may include and transmit the descriptor in at least one of the first content stream and the second content stream to the content reproduction apparatus.

Reference may be made to FIGS. 1 to 6 for any descriptions omitted in FIG. 7.

Figure 8:
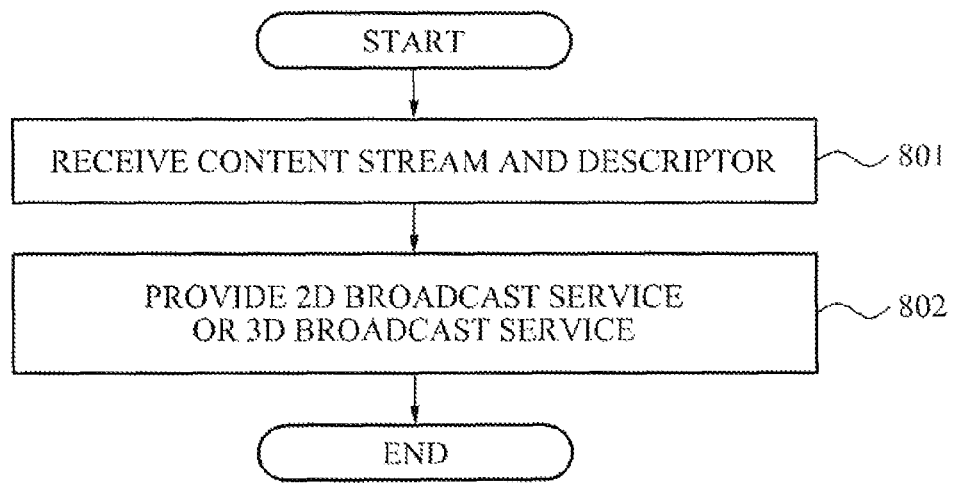
FIG. 8 illustrates a content reproduction method according to an exemplary embodiment of the present invention.

FIG. 8 illustrates a content reproduction method according to an exemplary embodiment of the present invention.

Referring to FIG. 8, a content reproduction apparatus may receive a first content stream, a second content stream, and a descriptor to a content providing apparatus in operation 801. Here, the descriptor may include identification information to identify the first content stream and the second content stream. Further, the descriptor may include synchronization information to synchronize the first content stream and the second content stream. Also, the descriptor may include additional information to improve image quality of the first content stream or the second content stream. In addition, the descriptor may include crop information to indicate whether an image included in the first content stream or the second content stream is cropped.

Subsequently, the content reproduction apparatus may provide a 2D broadcast service or a 3D broadcast service based on the first content stream and the second content stream using a parameter included in the descriptor in operation 802.

Reference may be made to FIGS. 1 to 6 for any descriptions omitted in FIG. 8.

The methods according to exemplary embodiments of the present invention may be recorded in computer-readable media including program instructions to implement various operations embodied by a computer. The media may also include, alone or in combination with the program instructions, data files, data structures, and the like. The program instructions recorded in the media may be those specially designed and constructed for the purposes of the present invention, or they may be of the kind well-known and available to those having skill in the computer software arts.

Although the present invention has been shown and described with reference to a few exemplary embodiments and the drawings, it is not limited to the described embodiments. Instead, it would be appreciated by those skilled in the art that changes and modifications may be made to these embodiments without departing from the principles and spirit of the invention, the scope of which is defined by the claims and their equivalents.

The invention claimed is:

1. A content providing method comprising:
generating a first content stream corresponding to a reference image and a second content stream corresponding to a supplementary image;
generating a descriptor associated with the first content stream and the second content stream; and
transmitting the first content stream, the second content stream, and the descriptor to a content reproduction apparatus,
wherein the descriptor includes at least one of:
(i) an M/H Service id related to the supplementary image for a stereoscopic service,
(ii) a leftview_flag to determine whether a M/H video stream is used as a left image, and
(iii) synchronization information including an offset_sign_bit, and a timestamp_offset related to an Access Unit (AU)2
wherein the timestamp offset is determined based on PTS which is a timestamp corresponding to an AU of the reference image and RTP timestamp which is a time stamp corresponding to an AU of the supplementary image, and
wherein the reference image is transmitted using a Main broadcasting service, the supplementary image is transmitted using a Mobile broadcasting service.

2. The content providing method of claim 1, wherein the generating of the descriptor generates a descriptor comprising identification information to identify the first content stream and the second content stream.

3. The content providing method of claim 1, wherein the generating of the descriptor generates a descriptor comprising synchronization information to synchronize the first content stream and the second content stream.

4. The content providing method of claim 1, wherein the generating of the descriptor generates a descriptor comprising additional information to improve image quality of the first content stream or the second content stream.

5. The content providing method of claim 1, wherein the generating of the descriptor generates a descriptor comprising crop information to indicate whether an image included in the first content stream or the second content stream is cropped.

6. The content providing method of claim 1, wherein the transmitting of the first content stream, the second content stream, and the descriptor to the content reproduction apparatus comprises and transmits the descriptor in at least one of the first content stream and the second content stream.

7. The content providing method of claim 1, wherein the reference image is transmitted in a stationary broadcast standard and the supplementary image is transmitted in a mobile broadcast standard.

8. A content reproduction method comprising:
receiving a first content stream corresponding to a reference image, a second content stream corresponding to a supplementary image, and a descriptor associated with the first content stream and the second content stream from a content providing apparatus; and
providing a two-dimensional (2D) broadcast service or a three-dimensional (3D) broadcast service based on the first content stream and the second content stream using the descriptor,
wherein the descriptor includes at least one of:
(i) an M/H Service id related to the supplementary image for a stereoscopic service,
(ii) a leftview_flag to determine whether a M/H video stream is used as a left image, and
(iii) synchronization information including an offset_sign_bit, and a timestamp_offset related to an Access Unit (AU)
wherein the timestamp offset is determined based on PTS which is a timestamp corresponding to an AU of the reference image and RTP timestamp which is a time stamp corresponding to an AU of the supplementary image, and
wherein the reference image is transmitted using a Main broadcasting service, the supplementary image is transmitted using a Mobile broadcasting service.

9. The content reproduction method of claim 8, wherein the descriptor comprises identification information to identify the first content stream and the second content stream.

10. The content reproduction method of claim 8, wherein the descriptor comprises synchronization information to synchronize the first content stream and the second content stream.

11. The content reproduction method of claim 8, wherein the descriptor comprises additional information to improve image quality of the first content stream or the second content stream.

12. The content reproduction method of claim 8, wherein the descriptor comprises crop information to indicate whether an image included in the first content stream or the second content stream is cropped.

* * * * *